Nov. 24, 1970     O. K. SCHWENZFEIER     3,541,864

COMPOSITE ROLLER MECHANICAL VIBRATION GENERATOR

Filed Oct. 15, 1968

INVENTOR:
OTTO KURT SCHWENZFEIER

BY: *Frelling E Baker*

HIS ATTORNEY

United States Patent Office 3,541,864
Patented Nov. 24, 1970

3,541,864
COMPOSITE ROLLER MECHANICAL VIBRATION GENERATOR
Otto Kurt Schwenzfeier, Chula Vista, Calif., assignor to Shell Oil Company, New York, N.Y., a corporation of Delaware
Filed Oct. 15, 1968, Ser. No. 767,764
Int. Cl. B06b *3/00*
U.S. Cl. 74—87                    1 Claim

ABSTRACT OF THE DISCLOSURE

The roller of an orbiting roller vibration generator is constructed of a plurality of substantially identical cylindrical rollers eccentrically carried on a radially compliant crank-arm for rotatable engagement with an internal raceway formed in an oscillator body member.

BACKGROUND OF THE INVENTION

The present invention is directed to mechanical vibration generators and pertains more particularly to an improved roller construction for an orbiting mass type oscillator.

Many industrial uses of high power or high levels of sonic energy have recently been found. These include sonic pile driving, drilling, earth moving, treatment of liquids and other materials. These uses generally employ a resonance system for delivering the vibrations or energy from an oscillator to a work member. The workload is generally characterized as having a high impedance and a low velocity amplitude. These systems generally develop high forces at relatively high frequencies.

One major problem with such systems is the lack of effective oscillators or vibration generators capable of developing the necessary high forces and accelerations. The most promising oscillator developed for these applications is the orbiting roller type of oscillator wherein a cylindrical roller orbits within an internal raceway. The radially directed centrifugal forces developed by the eccentric roller are transmitted through the raceway into the body member of the oscillator which is coupled to what is generally referred to as a resonator. A typical resonator member is an elastic rectangular bar constructed of material such as a good grade of steel in which either lateral or longitudinally-directed standing wave vibrations are developed by means of the oscillator and transmitted from the bar to a work member.

One of the major problems with the orbiting roller type of generator is the development of secondary vibrations or oscillations due to the endplay or axially directed forces of the rotor when the oscillator is mounted so that the rotor orbits about a horizontal axis. Experience has shown that at high speeds, when the forces between roller and raceway approach contact stress limits, the forces necessary to keep the cylindrical shaped roller axially centered in the raceway become critical and the roller tends to drift back and forth crowding first one end guide and then the other. This end drift tends to generate secondary vibrations as well as cause severe malfunction of the oscillator and excessive wear and deterioration of working parts. This trouble is caused in part by the fact that it is almost impossible to machine a perfect cylinder for the roller or its raceway. As a consequence, under ordinary machining conditions one or both of the roller and cylinder raceways may be slightly tapered. This may cause the roller to tend to drift to one end or the other of the raceway.

Another cause of such problems is a difficulty in applying an even driving force to both ends of the roller. This results in one end of the roller tending to lead the other end, thus causing the roller to tend to drift to one end of the cylindrical raceway.

The above described problems obviously would not exist with an oscillator having a vertically oriented axis such that vibratory force is applied to the work member in a horizontal plane. In such a situation, the weight of the rotor would force it to the lower end of the raceway and overcome any force tending to cause the rotor to drift upward. Thus, no back and forth drift would exist.

SUMMARY OF THE INVENTION

It is a primary object of the present invention to eliminate the above problems in high speed resonant load vibration generators by eliminating the drift of an orbiting roller type oscillator.

It is a further object of the present invention to increase the life of orbiting roller type oscillators by providing improved roller construction which roller drift substantially eliminates at high speeds.

The above and other objects of the present invention are carried out by providing an orbiting roller oscillator wherein the roller is comprised of a composite roller formed of two or more short cylindrical segments carried on a radially compliant crank shaft to permit radial engagement of the roller with the internal raceway of the oscillator body.

BRIEF DESCRIPTION OF THE DRAWINGS

The above and other objects and advantages of the present invention will become apparent to those skilled in the art from the following specification when read in conjunction with the drawings in which.

DESCRIPTION OF PREFERRED EMBODIMENTS

Figure 1:
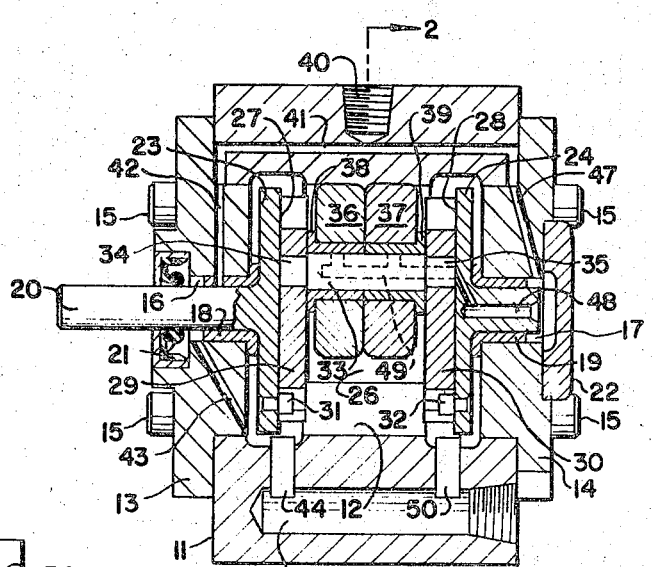
FIG. 1 is a side elevation in section of a preferred embodiment of the present invention.
Figure 2:
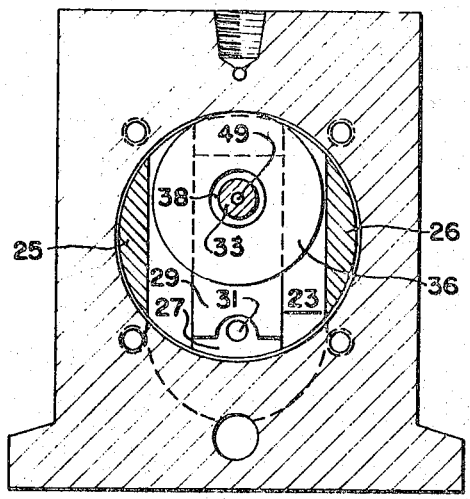
FIG. 2 is an end view section taken substantially along lines 2—2 of the embodiment of FIG. 1.

Referring now to the drawings and more particularly to FIGS. 1 and 2, there is shown a housing member designated by numeral 11 having a central substantially cylindrical raceway 12 formed therein. A pair of end plates 13 and 14 close off the ends of the housing and are held in place such as by stud bolts 15. A bore 16 is formed in plate 13 and a like bore 17 is formed in plate 14 for supporting or receiving suitable journal bearing means 18 and 19 in which is journaled a crank shaft 20. Suitable seal means 21 seals off the journal bearing means 18. A cap or seal member 22 seals or closes off bearing journal means 19. The crank shaft 20 comprises a pair of endplates 23 and 24 suitably connected together by means of a pair of bridge or saddle members 25 and 26. Each end plate 23 and 24 have guideways 27 and 28 formed therein for receiving sliding block members 29 and 30. A pair of stop members 31 and 32 limit the movement of block members 29 and 30 in the guideways 27 and 28. A shaft 33 is mounted for radial movement such as in holes 34 and 35 in members 29 and 30. This mounting permits shaft 33 to move radially outward with sliding blocks 29 and 30 under the influence of centrifugal force from the roller 36, 37. The roller support assembly comprising block members 29, 30, shaft 33 and bearing members 38, 39, must be counterbalanced in order to prevent excessive centrifugal forces on bearings 38 and 39. Without counterbalancing, the shaft 33 alone could develop destructive radial forces on the order of 10 times that of the driving force appled to roller 36, 37. Counterbalancing may be carried out by increasing the mass of ends of block members 29 and 30 opposite shaft 33 to equal that of shaft 33 and bearings 38 and 39. A composite roller or rotor comprising a plurality of substantially identical cylindrical rollers 36 and 37 is rotatably journaled for orbit about a horizontal axis by means of bearings 38 and 39 on shaft 33. The rollers 36 and 37 are preferably constructed to have a relatively small length to diameter ratio. In other words the length of the roller measured along its axis is small as compared to the diameter of the roller.

This small axial dimension of each roller reduces any moment that would be applied to the roller by virtue of any taper or other distortions in either the roller or the raceway. Moreover, a plurality of these rollers having identical axial lengths may be arranged to counteract each other so that a roller that tends to drift to the left is counteracted by one that tends to drift to the right. The cumulative effect of the construction is to considerably reduce or substantially eliminate the problem of endplay.

A suitable lubrication system for the generator of the present invention is provided wherein a lubricating fluid from a source (not shown) is admitted through port 40 and travels via conduit 41 in housing 11 and via conduit 42 is end plate 13 to lubricate bearing member 18. The fluid then flows from bearings 18 via conduit 43 in end plate 13 to passageway 44 communicating from one end of raceway 12 to sump or conduit 45. Fluid also travels via conduit 41 to conduit 47 in end plate 14 to lubricate bearing 19 and via conduit 45 in end plate 24 to conduit 49 and shaft 33 to lubricate bearings 38 and 39. A second passageway 50 communicates from the other end of raceway 12 to sump 45.

Figure 3:
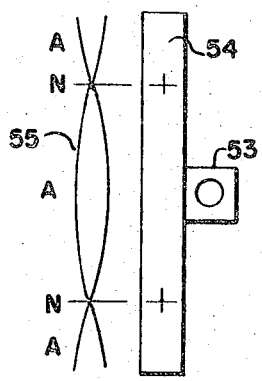
FIG. 3 is a side elevation showing a resonant system utilizing the apparatus of the present invention.

FIG. 3 illustrates a vibration generator 53 such as that described above coupled to an elastic resonator bar 54 to provide a typical elastic resonant system for the application of high levels of sonic or vibratory energy to a work member. The resonator bar 54 is typically vibrated in a lateral standing wave mode of vibration as illustrated by the wave pattern 55. The standing wave pattern 55 illustrates the fact that the bar will have typical velocity antinodes at the ends and at the center, and velocity nodes appearing about one-quarter of the length of the bar from the ends thereof. The velocity antinodes (A) are points of maximum velocity and motion and is a typical point of attachment for work members or tools. The velocity nodes (N) are points of minimum vibrational velocities and amplitudes and are typically used as support points by the resonator member.

Figure 4:
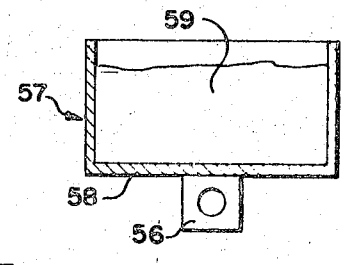
FIG. 4 is a side view partially in section of a second resonant system embodying an improved oscillator of the present system.

Illustrated in FIG. 4 is another example of suitable resonant vibration system in which an oscillator 56 is attached or coupled to a vessel 57 the bottom of which 58 serves as the elastic resonator member. The vessel 57 may be used for the treatment of the liquid 59.

While the invention has been described with respect to specific embodiments, it is obvious that many modifications and changes in structure and arrangement of the invention may be made without departing from the scope thereof as defined in the appended claim.

I claim as my invention:

1. In a resonant vibratory system, the combination of:
   an elastic resonant member for coupling an oscillator to a work member and transmitting vibrations thereto at a resonant frequency of said resonant member;
   a sonic vibration generator acoustically coupled to said resonant member to apply vibrations thereto in a substantially vertical plane;
   said generator comprising housing means;
   a bearing raceway in said housing means;
   a composite inertial rotor mounted for orbital travel around a horizontal axis in said raceway;
   said composite rotor comprising a plurality of independently-rotatable axially-displaced rollers of identical axial length;
   each of said rollers having a large diameter-to-length-ratio and being adapted to counteract the drift of another of said rollers;
   a rotatable crankshaft mounted for rotation about said horizontal axis in said housing; and
   a freely radially movable crank pin means carried by said crankshaft and operatively engaging said rotor, and permitting said rotor to move radially outward into engagement with said raceway under centrifugal force.

References Cited
UNITED STATES PATENTS

| | | | |
|---|---|---|---|
| 1,733,373 | 10/1929 | Jubien et al. | 74—87 |
| 2,127,317 | 8/1938 | Welch | 74—61 |
| 2,841,995 | 7/1958 | Sieber | 74—87 |
| 2,956,438 | 10/1960 | Sieber | 74—87 |
| 3,189,106 | 6/1965 | Bodine | 74—61 X |
| 3,266,739 | 8/1966 | McKibben | 74—87 X |
| 3,299,722 | 1/1967 | Bodine. | |

MILTON KAUFMAN, Primary Examiner